United States Patent
Hsu

(10) Patent No.: US 9,019,213 B2
(45) Date of Patent: Apr. 28, 2015

(54) TOUCH PANEL AND SUBSTRATE THEREOF

(75) Inventor: Jane Hsu, Taoyuan County (TW)

(73) Assignee: Derlead Investment Ltd., Taipei (TW)

( * ) Notice: Subject to any disclaimer, the term of this patent is extended or adjusted under 35 U.S.C. 154(b) by 989 days.

(21) Appl. No.: 13/158,844

(22) Filed: Jun. 13, 2011

(65) Prior Publication Data

US 2012/0092276 A1 Apr. 19, 2012

(30) Foreign Application Priority Data

Oct. 14, 2010 (TW) .............................. 99219790 U

(51) Int. Cl.
*G06F 3/041* (2006.01)
*G06F 3/045* (2006.01)

(52) U.S. Cl.
CPC ...................... *G06F 3/045* (2013.01)

(58) Field of Classification Search
USPC ........................................................ 345/173
See application file for complete search history.

(56) References Cited

U.S. PATENT DOCUMENTS

2004/0027339 A1* 2/2004 Schulz .......................... 345/173
2011/0012841 A1* 1/2011 Lin ................................ 345/173

* cited by examiner

*Primary Examiner* — Charles V Hicks
(74) *Attorney, Agent, or Firm* — Ming Chow; Sinorica, LLC

(57) ABSTRACT

A substrate of a touch panel has a body, a dielectric layer and multiple wires. The dielectric layer is formed on the bottom surface of the body and has multiple sensing areas and a wiring area. The wiring area is formed around the sensing areas and has multiple rough surfaces formed on the wiring area and being identical to the sensing areas in number. The wires are identical to the sensing areas in number. Each wire is formed on one of the rough surfaces of the wiring area and is electrically connected with one of the sensing areas. The formation of the wires on the respective rough surfaces can enhance adhesion of the wires so that the wires do not easily come off or get fractured.

12 Claims, 4 Drawing Sheets

TOUCH PANEL AND SUBSTRATE THEREOF

BACKGROUND OF THE INVENTION

1. Field of the Invention

The present invention relates to a substrate of a touch panel, and more particularly to a substrate having wires mounted on a rough surface on a dielectric layer of the substrate so that the wires are uneasy to be fractured or come off.

2. Description of the Related Art

To keep abreast of advancement of technology, electronic equipment has an ever-demanding requirement concerning miniaturization, portability, operational simplicity and the like. As the touch technology gets rid off the use of a keyboard to fulfill the downsizing requirement of electronic products, touch panels have been vastly applied to electronic equipment such as personal digital assistants (PDA), mobile phones and the like, recently. The technologies of touch panels can be classified into capacitive type, resistive type, surface acoustic wave type, optical type and the like. Among them, the resistive touch panels are leading in terms of the global market share of touch panels, which is about 60% and more. The resistive touch panels are mainly applied to electronic products, such as self-service order system, PDA, electronic dictionary, mobile phone, inventory management machine, point-of-sale (POS) cash register, signature capture credit card processing POS terminal, medical surveillance system and the like. As the resistive touch panels are induced by pressure, touch media used to generate a touch signal are not restricted. The resistive touch panels can be operated by any one of a hand, a pencil, a credit card, a wood stick or the like or even by a hand wearing a glove. The resistive touch panels can be categorized into 8-wire, 7-wire, 6-wire, 5-wire, 4-wire resistive touch panels and the like.

Regularly, a touch panel has at least one substrate. Each one of the at least one substrate has an indium tin oxide (ITO) conductive layer, a wiring area and multiple wires. The ITO conductive layer is formed on the substrate. The wiring area is formed around three sides of a perimeter of the ITO conductive layer. The wires are printed on the wiring area and electrically connected to the ITO conductive layer. The wires are concentrated and connected to multiple leading lines. After the intelligent touch screen mobile phones, such as iPhone from Apple Inc., are released to the market, multi-touch operation can be achieved by capacitive touch panels. However, as the capacitive touch panels involve precise and sophisticated computation techniques, the production cost thereof is still high. In contrast, a resistive touch panel is advantageous in simple structure and lower cost. Therefore, multi-touch resistive touch panels are developed to emerge in the market.

To achieve a multi-point touch effect, a conventional resistive touch technology divides a conductive layer formed inside the touch panel into multiple blocks. Each block is electrically connected to the leading lines through an electrode and a wire. A user can simultaneously touch the blocks with fingers or tools, such as a stylus, to indirectly achieve a multi-touch operation effect generated by touching multiple points. An improved matrix touch panel based on the resistive touch technology can achieve the intended multi-touch effect by dividing the ITO conductive layer into multiple strip-like conductive layers. To maintain the accuracy of the touch panel and a multi-touch operation effect generated by touching multiple points, increasing the number of conductive layers is inevitably a trend to go in production. While more blocks are divided, the wires connected to the ITO layer also increase. To take operational requirement into account, the size of the ITO conductive layer must be maintained at a certain range. If the number of the wires increases and the wiring area is kept at a certain size for matching the size of the conductive layer, the width of the wires must be reduced so that the wires can be arranged on a limited space of the substrate.

If the wires are printed on the substrate, the widths of the wires are uneasy to be reduced. Uneven widths of the wires can lead to unstable or even increased resistance value of the wires. Additionally, the surface of the substrate is very smooth, and the wires are difficult to be firmly formed on the substrate. A contact area between a wire with reduced width and the substrate also decreases, thereby making the wires easily come off from the substrate and get fractured.

SUMMARY OF THE INVENTION

An objective of the present invention is to provide a substrate of a touch panel having enhanced adhesion of wires formed on the substrate.

To achieve the foregoing objective, the substrate has a body, a dielectric layer and multiple wires.

The body has a bottom surface.

The dielectric layer is formed on the bottom surface of the body and has multiple sensing areas and a wiring area. The wiring area is formed around the sensing areas and has multiple rough surfaces formed on the wiring area and being identical to the sensing areas in number.

The wires are identical to the sensing areas in number. Each wire is formed on one of the rough surfaces of the wiring area and is electrically connected with one of the sensing areas.

Preferably, the wiring area has multiple wire slots formed in a certain portion of the wiring area, each wire slot is defined by two adjacent walls, the walls are identical to the wires in number, each wall has a rough surface formed on a top of the wall, and each wire is formed on the rough surface of one of the walls.

The substrate of the present invention is advantageous in having enhanced adhesion between the wires and the respective rough surfaces on the wiring area of the dielectric layer. Accordingly, the wires can be securely formed on the wiring area without easily coming off or getting fractured. Not only can the sensing areas of the substrate in operation be maintained at a smaller size, but also the yield of the touch panel in production can be improved.

Other objectives, advantages and novel features of the invention will become more apparent from the following detailed description when taken in conjunction with the accompanying drawings.

DETAILED DESCRIPTION OF THE INVENTION

Figure 1:
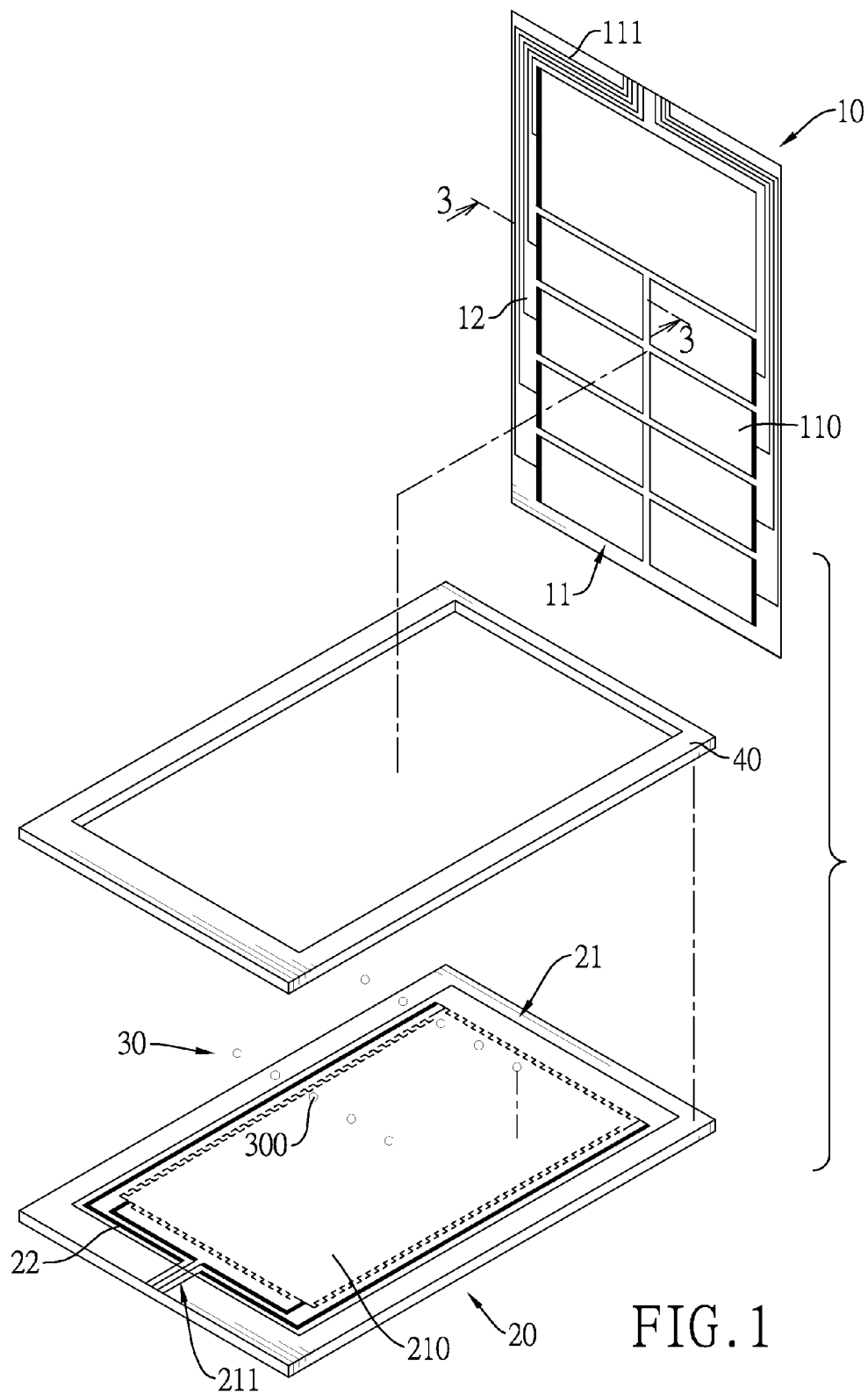
FIG. 1 is an exploded perspective view of a first embodiment of a touch panel in accordance with the present invention.

With reference to FIG. 1, a touch panel in accordance with the present invention is a multi-point hybrid touch panel and has an upper substrate 10, a lower substrate 20, a separation layer 30 and an insulating adhesive layer 40.

The upper substrate 10 has an upper body, an upper dielectric layer 11 and multiple upper wires 12. The upper dielectric layer 11 is mounted on a bottom surface of the upper body of the upper substrate 10 and has multiple upper sensing areas 110 and an upper wiring area 111. The upper wiring area 111 is formed around the upper sensing areas 110 and has multiple rough surfaces formed on a top surface of the upper wiring area 111 and being identical to the upper sensing areas 110 in number. The upper dielectric layer 11 may be composed of indium tin oxide (ITO). Patterns of the upper sensing areas 110 and the upper wiring area 111 may be formed by fabrication processes, such as the lithography process and etching process and other equivalent processes. The upper wires 12 are identical to the upper sensing areas 110 in number. Each upper wire 12 is formed on one of the rough surfaces of the upper wiring area 111, is electrically connected with one of the upper sensing areas 110, is composed of metal or conductive graphite, and may be formed by an immersion plating process or other equivalent processes.

The lower substrate 20 has a lower body, a lower dielectric layer 21 and multiple lower wires 22. The lower dielectric layer 21 of the lower substrate 20 is formed on a top surface of the lower substrate 20, and has a lower sensing area 210 and a lower wiring area 211. The lower wiring area 211 is formed around the lower sensing area 210 and has at least one rough surface formed on a top surface of the lower wiring area 211. The lower dielectric layer 21 may be composed of ITO. Patterns of the lower sensing areas 210 and the lower wiring area 211 may be formed by fabrication processes, such as the lithography process and etching process and other equivalent processes. Each lower wire 22 is formed on one of the at least one rough surface on the lower wiring area 211, is electrically connected with the lower sensing area 210, is composed of metal or conductive graphite, and may be formed by an immersion plating process or other equivalent processes.

The separation layer 30 is composed of multiple spacers 300. The separation layer 30 is mounted between the upper dielectric layer 11 of the upper substrate 10 and the lower dielectric layer 21 of the lower substrate 20. The insulating adhesive layer 40 is mounted between the upper dielectric layer 11 of the upper substrate 10 and the lower dielectric layer 21 of the lower substrate 20 and surrounds a perimeter of the separation layer 30 so as to bond the upper substrate 10 and the lower substrate 20 together.

Figure 2:
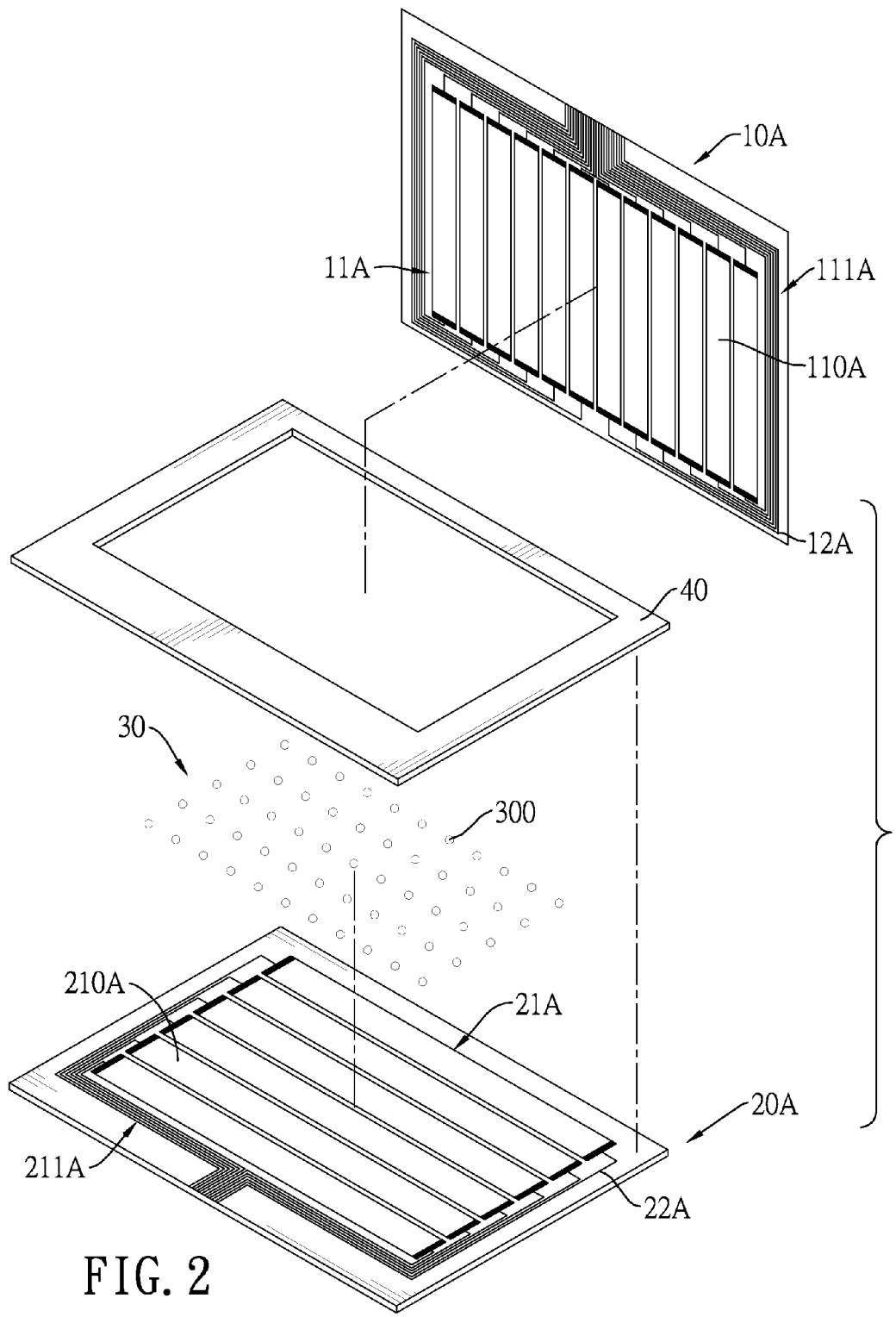
FIG. 2 is an exploded perspective view of a second embodiment of a touch panel in accordance with the present invention.

With reference to FIG. 2, a multi-point matrix touch panel in accordance with the present invention has an upper dielectric layer 11A formed on an upper substrate 10A and a lower dielectric layer 21A formed on a lower substrate 20A. The upper dielectric layer 11A has multiple upper sensing areas 110A and an upper wiring area 111A. The upper sensing areas 110A are rectangular, are parallelly formed on the upper dielectric layer 11A and align in a first direction. The upper wiring area 111A is formed around the upper sensing areas 110A. The lower dielectric layer 21A has multiple lower sensing areas 210A and a lower wiring area 211A. The lower sensing areas 210A are rectangular, are parallelly formed on the lower dielectric layer 21A and align in a second direction perpendicular to the first direction. The lower wiring area 211A is formed around the lower sensing areas 210A.

The dielectric layer 11 on the upper substrate 10 of the hybrid touch panel and the dielectric layer 11A, 21A on each of the upper substrate 10A and the lower substrate 20A of the matrix touch panel respectively have multiple sensing areas 110, 110A, 210A. In response to the demand for more touch points of the touch panel in operation, the number of the sensing areas 110, 110A, 210A has to increase first, and then the upper wires 12, 12A and the lower wires 22A electrically connected with the respective upper sensing areas 110, 110A and the lower sensing areas 210A also need to increase in number. However, if more upper wires 12, 12A or lower wires 22A are added within the same upper wiring area 111, 111A, 211A, the width of each upper wire 12, 12A or each lower wire 22A inevitably needs to be reduced.

Figure 3:
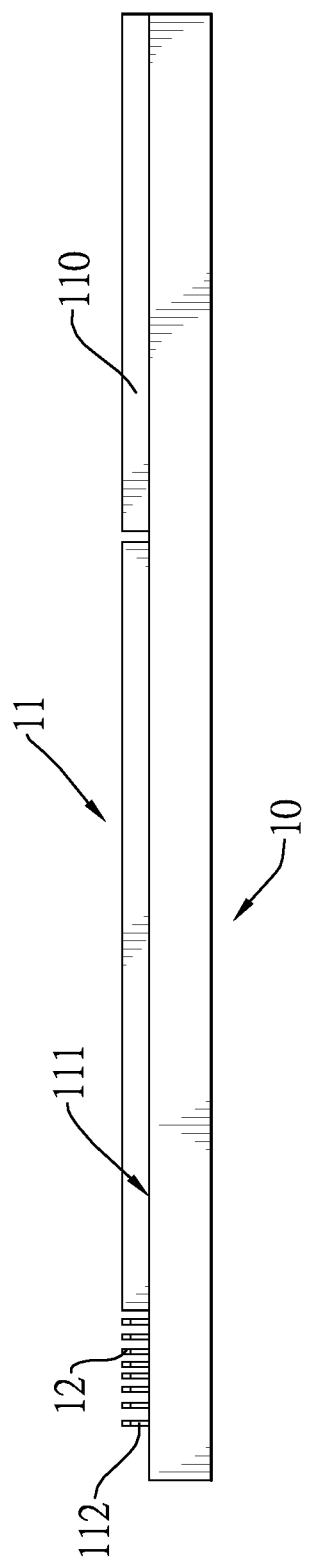
FIG. 3 is an enlarged side view of an upper substrate of the touch panel in FIG. 1.
Figure 4:
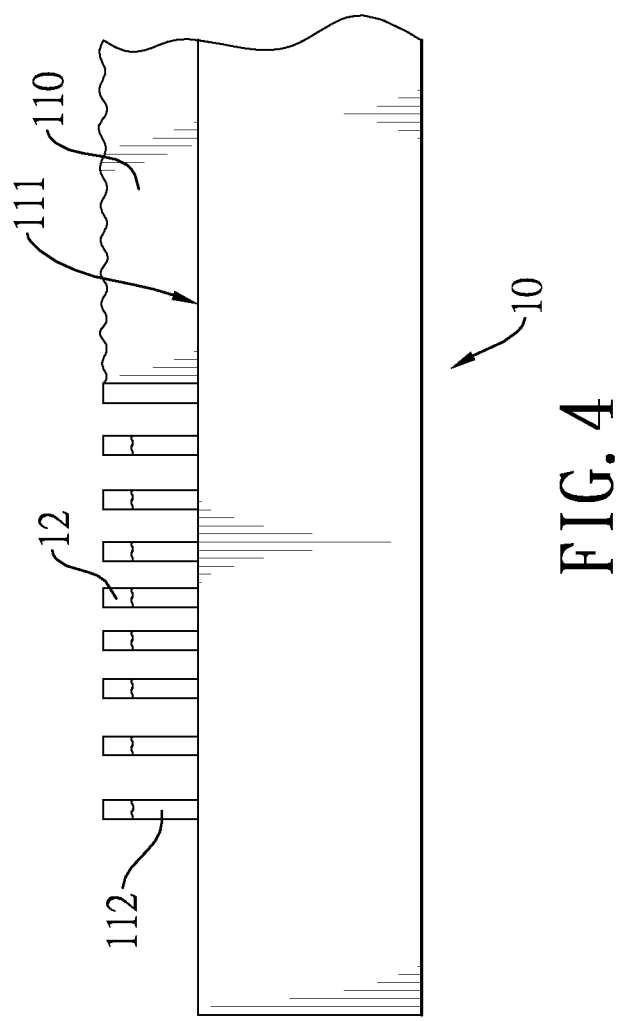
FIG. 4 is a partially enlarged side view of the upper substrate in FIG. 3.

With reference to FIGS. 3 and 4, an upper substrate 10 of the hybrid touch panel in FIG. 1 is shown. The upper wiring area 111 has multiple walls 112 and multiple wire slots. The walls 112 are identical to the wires in number. Each wall has a rough surface formed on a top of the wall. Each wire is formed on the rough surface of one of the walls. The wire slots are formed in a certain portion of the upper wiring area 111 by an etching process. Each wire slot is defined by two of the walls 112 adjacent to each other. Each upper wire 12 is formed on the rough surface of one of the walls 112 by an immersion plating process. Given the rough surfaces of the walls 112 on the upper wiring area 111, adhesion between each wire 12 and the upper wiring area 111 is stronger so that the wire 12 does not easily come off or get fractured. Accordingly, the widths of the upper wires 12 can be effectively reduced to facilitate formation of additional upper sensing areas 110. Not only can the sensing areas of the upper substrate 10 in operation be maintained at a smaller size, but also the yield of the touch panel in production can be improved. Likewise, the structure of the upper substrate 10 of the hybrid touch panel can be applied to the upper substrate 10A or the lower substrate 20A of the matrix touch panel to achieve the downsizing sensing areas and an enhanced yield of the touch panel.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A substrate of a touch panel comprising:
    a body having a bottom surface;
    a dielectric layer formed on the bottom surface of the body, and having:
        multiple sensing areas; and
        a wiring area formed around the sensing areas and having:
            multiple rough surfaces formed on the wiring area and being identical to the sensing areas in number;
            multiple walls, each wall has a rough surface formed on a top of the wall; and
            multiple wire slots formed in the wiring area, each wire slot defined by adjacent two of the walls; and
        multiple wires being identical to the sensing areas and the walls of the wiring area in number, each wire formed on the rough surfaces of one of the walls of the wiring area and electrically connected with one of the sensing areas.

2. The substrate as claimed in claim 1, wherein the sensing areas and the wiring area of the dielectric layer are composed of indium tin oxide.

3. The substrate as claimed in claim 1, wherein the wires are made of metal, and each wire is formed on the rough surface on the top of a corresponding wall on the wiring area.

4. The substrate as claimed in claim 1, wherein the wires are made of conductive graphite, and each wire is formed on the rough surface on the top of a corresponding wall on the wiring area.

5. A touch panel comprising:
an upper substrate having:
   a body having a bottom surface;
   a dielectric layer formed on the bottom surface of the body and having:
      multiple sensing areas; and
      a wiring area formed around the sensing areas and having multiple rough surfaces formed on the wiring area and being identical to the sensing areas in number; and
   multiple wires being identical to the sensing areas in number, each wire formed on one of the rough surfaces of the wiring area and electrically connected with one of the sensing areas;
a lower substrate having:
   a body having a top surface;
   a dielectric layer formed on the top surface of the body and having:
      multiple sensing areas; and
      a wiring area formed around the sensing areas and having multiple rough surfaces formed on the wiring area and being identical to the sensing areas in number; and
   multiple wires, each wire formed on one of the rough surfaces of the wiring area and electrically connected with the sensing area;
a separation layer mounted between the upper substrate and the lower substrate; and
an insulating adhesive layer mounted between the upper substrate and the lower substrate and surrounding a perimeter of the separation layer;
each wiring area of the upper substrate and the lower substrate further has:
multiple walls being identical to the wires in number, wherein each wall has a rough surface formed on a top of the wall, and each wire is formed on the rough surface of one of the walls; and
multiple wire slots formed in the wiring area, each wire slot defined by adjacent two of the walls.

6. The touch panel as claimed in claim 5, wherein the sensing areas and the wiring areas of the dielectric layers of the upper substrate and the lower substrate are composed of indium tin oxide.

7. The touch panel as claimed in claim 5, wherein the wires of the upper substrate and the lower substrate are made of metal, and each wire is formed on the rough surface on the top of a corresponding wall on the wiring area.

8. The touch panel as claimed in claim 5, wherein the wires of the upper substrate and the lower substrate are made of conductive graphite, and each wire is formed on the rough surface on the top of a corresponding wall on the wiring area.

9. A touch panel comprising:
an upper substrate having:
   a body having a bottom surface;
   a dielectric layer formed on the bottom surface of the body and having:
   multiple sensing areas; and
   a wiring area formed around the sensing areas and having multiple rough surfaces formed on the wiring area and being identical to the sensing areas in number; and
   multiple wires being identical to the sensing areas in number, each wire formed on one of the rough surfaces of the wiring area and electrically connected with one of the sensing areas;
a lower substrate having:
   a body having a top surface;
   a dielectric layer formed on the top surface of the body and having:
   a sensing area; and
   a wiring area formed around the sensing area and having at least one rough surface formed on the wiring area; and
   multiple wires, each wire formed on one of the at least one rough surface of the wiring area and electrically connected with the sensing area;
a separation layer mounted between the upper substrate and the lower substrate; and
an insulating adhesive layer mounted between the upper substrate and the lower substrate and surrounding a perimeter of the separation layer;
each wiring area of the upper substrate and the lower substrate has:
multiple walls being identical to the wires in number, wherein each wall has a rough surface formed on a top of the wall, and each wire is formed on the rough surface of one of the walls; and
multiple wire slots formed in the wiring area, each wire slot defined by adjacent two of the walls.

10. The touch panel as claimed in claim 9, wherein the sensing areas and the wiring area of the dielectric layers of the upper substrate and the lower substrate are composed of indium tin oxide.

11. The touch panel as claimed in claim 9, wherein the wires of the upper substrate and the lower substrate are made of metal, and each wire is formed on the rough surface on the top of a corresponding wall on the wiring area.

12. The touch panel as claimed in claim 9, wherein the wires of the upper substrate and the lower substrate are made of conductive graphite, and each wire is formed on the rough surface on the top of a corresponding wall on the wiring area.

\* \* \* \* \*